United States Patent [19]

Taguchi

[11] 4,375,688

[45] Mar. 1, 1983

[54] GAS LASER TUBE

[75] Inventor: Noboru Taguchi, Tokyo, Japan

[73] Assignee: Nippon Electric Co., Ltd., Tokyo, Japan

[21] Appl. No.: 192,957

[22] Filed: Oct. 1, 1980

[30] Foreign Application Priority Data

Oct. 1, 1979 [JP] Japan .............. 54-136099[U]

[51] Int. Cl.³ .............................. H01S 3/03
[52] U.S. Cl. ......................... 372/65; 372/61; 372/55
[58] Field of Search .............. 372/65, 61, 55

[56] References Cited

U.S. PATENT DOCUMENTS 3,613,027 10/1971 Westermeier ............ 372/61
4,240,045 12/1980 Gloser ...................... 372/61

Primary Examiner—William L. Sikes
Assistant Examiner—Leon Scott
Attorney, Agent, or Firm—Sughrue, Mion, Zinn, Macpeak and Seas

[57] ABSTRACT

In a gas laser tube including a laser capillary tube having one fixed end secured to the envelope surrounding the capillary tube and one free end. A support structure for the free end comprising a discharge diverting tube extending from the envelope toward and overlapping the free end of the laser capillary tube and a coil spring interposed between the free end portion of the laser capillary tube and the inner wall of the discharge diverting tube. The free end portion of the capillary tube is supported resiliently by the coil spring and the capillary tube is kept straight without bending or vibrating while absorbing the elongation of the capillary tube caused by thermal expansion.

9 Claims, 4 Drawing Figures

GAS LASER TUBE

BACKGROUND OF THE INVENTION

The present invention relates to a gas laser tube structure, and more particularly to a supporting structure for an end portion of a capillary tube within a gas laser tube.

Among the gas lasers, He-Ne gas lasers have been widely used as a light source for "Point of Sales" equipment, video disk apparatus, etc., because they are compact, light in weight and easy to handle. For such light source use, He-Ne lasers having an output power of 1 mW~2 mW are often used, and those having an output power of about 5 mW are also in great demand.

In a He-Ne gas laser tube, as is well known, a laser capillary tube in which a laser medium is produced by discharge, is coaxially disposed within a vacuum envelope containing He and Ne gases, and reflecting mirrors, to be used as a resonator, are disposed on opposite ends of the laser capillary tube. One end of this laser capillary tube is fixedly secured to the vacuum envelope, but the other end is free in order to prevent distortion or damage caused by thermal expansion.

Since the output power of a gas laser depends upon the laser capillary tube length, a laser tube providing a high output power must include a long capillary tube. The capillary tube length of a laser tube of the 1 mW class is about 14 cm, but in the case of a laser tube of the 5 mW class it may be as long as about 30 cm. Since one end of a laser capillary tube is fixed to the envelope but the other end is free as described above, when the capillary tube length is increased, the capillary tube is bent by its weight under gravity. The magnitude of the bending caused by gravity is proportional to a fourth power of the capillary tube length, and hence, a laser capillary tube for a 5 mW laser tube will bend 20 times as much as that for a 1 mW laser tube. If the laser capillary tube bends in the above-described manner, then the light energy propagating back and forth between the reflecting mirrors for laser oscillation will be partly cut off, and as a result, the laser output power will be reduced.

Furthermore, a laser tube including a long capillary tube has the shortcoming that, when the laser tube changes its attitude, the mode of bending of the laser capillary tube is varied, and therefore, the laser output power is varied.

One of the solutions which have been heretofore employed for eliminating the shortcomings of the laser tube having a long capillary tube, such as power reduction and power variation, is the method employed in a 5 mW He-Ne laser oscillator Model 3225H-PC manufactured by Hughes Aircraft Co. in the United States. This method, as will be fully described later with reference to the accompanying drawings, involves a protrusion tube having such an inner diameter that a laser capillary tube may be snugly fitted therein which is projected from the end of the vacuum envelope opposite the end where the capillary tube is fixed and towards the free end of the laser capillary tube; the free end of the laser capillary tube is thus supported by snugly fitting it in the protrusion tube. However, since this method necessitates snug fitting, the manufacture of the laser tube becomes difficult and expensive; furthermore, the thus manufactured laser tube has the shortcoming that unless the snug fitting portion is carefully formed, there exist the possibilities that the fitting portion cannot absorb the elongation of the capillary tube caused by thermal expansion or the laser tube may be damaged by shock and friction.

SUMMARY OF THE INVENTION

One object of the present invention is to provide a gas laser tube having a simple structure that can prevent bending of the laser capillary tube.

Another object of the present invention is to provide a gas laser tube in which bending and vibration of the laser capillary tube can be eliminated and a stable output of laser oscillation can be obtained therefrom.

According to one feature of the present invention, there is provided a gas laser tube, in which for the purpose of preventing the bending or vibration of the laser capillary tube, a coil spring is interposed in a compressed form between the free end of the laser capillary tube and a discharge diverting tube which is projected from the vacuum envelope into the inner space of the laser tube. The laser capillary tube and/or the discharge diverting tube is provided with a ridge or a groove for retaining the interposed coil spring so that the coil spring may not slip out. As the material of the coil spring, stainless steel is preferably used.

With the above-described structure, the free end portion of the laser capillary tube is supported resiliently by the coil spring. Therefore, the capillary tube is not bent down or distorted by gravity, and moreover, even when a shock is applied externally to the gas laser tube, the vibration of the laser capillary tube caused by the shock can be quickly absorbed by the coil spring, so that reduction and/or variation of the laser output power does not occur.

DETAILED DESCRIPTION OF PREFERRED EMBODIMENT

Figure 1:
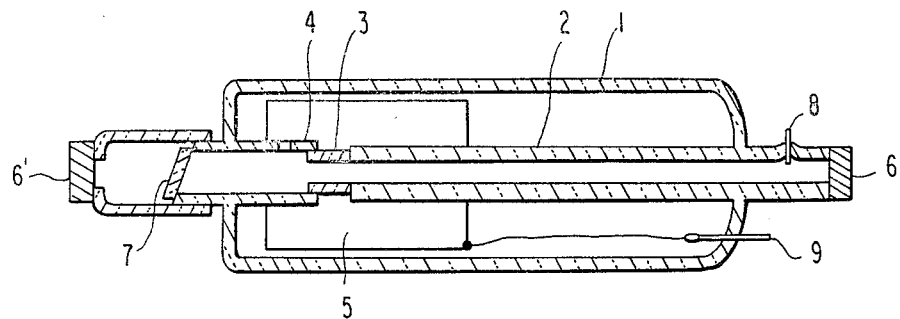
FIG. 1 is an axial cross-sectional view of a gas laser tube in the prior art.

As one example of gas laser tubes in the prior art, a Model 3225H-PC gas laser tube manufactured by Hughes Aircraft Co. is schematically shown in axial cross-section in FIG. 1. Referring to this figure, a free end portion of a laser capillary tube 2 having the other end fixedly secured to a vacuum envelope 1, has a tip end portion 3 with a smaller outer diameter than that of the other portion, and this smaller diameter portion 3 is snugly fitted in a protrusion tube 4 extending coaxially from the other end of the vacuum envelope 1. Bending and/or vibration of the laser capillary tube 2 is prevented by this snug fitting structure. As usual, the laser tube has reflecting mirrors 6 and 6' for forming a resonator, a Brewster's window 7, and electrodes 8 and 9.

However, the illustrated prior art laser tube has shortcomings. Since the work of grinding the outer periphery of the free end portion of the capillary tube 2 to form the smaller diameter portion 3 is necessary, the manufacturing cost is high, and unless the ground snug fitting portion is smooth, upon elongation of the capillary tube 2 by thermal expansion the capillary tube and/or the protrusion tube 4 may possibly be damaged due to friction.

Figure 2:
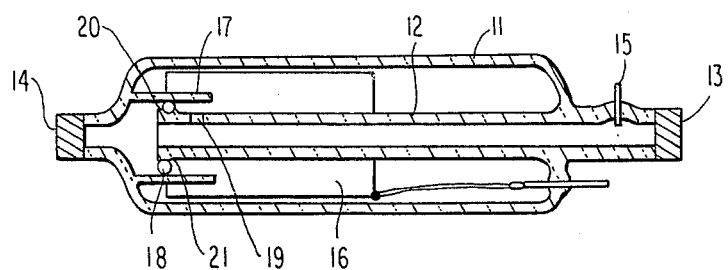
FIG. 2 is an axial cross-sectional view of a gas laser tube according to an embodiment of the present invention.

One preferred embodiment of the present invention is illustrated in FIG. 2. In this embodiment, a laser capillary tube 12 made of glass and having an inner diameter of about 1.2 mm and an outer diameter of about 7 mm is fixedly secured at its end coaxially to a cylindrical vacuum envelope 11 having an outer diameter of about 30 mm. A total reflection mirror 13 and an output mirror 14 for forming an optical resonator are fixed to the envelope at the opposite ends of the capillary tube 12. An anode 15 and a cathode 16 are provided in a known manner. A discharge diverting tube 17 made of glass and having an inner diameter of about 11 mm is projected from the end of the vacuum envelope 11 towards the free end of capillary tube 12 to overlap the free end portion of the capillary tube without contacting it. A coil spring 18 made of stainless steel is interposed in the space between the free end of the laser capillary tube 12 and the overlapped portion of the discharge diverting tube 17. The coil spring 18 is formed by shaping a coil having a diameter of about 2.2 mm and a length of about 13 mm into a ring form. The free end portion of the capillary tube covered by the discharge diverting tube is provided with a discharge passageway hole 19 and ridges 20 and 21 for retaining the coil spring 18 in position. As shown in FIG. 2, one end of the laser capillary tube 12 is fixedly secured to the vacuum envelope 11, and the other end thereof is free. The total reflection mirror 13 and the output mirror 14 are fixed to the opposed remote ends of the laser capillary tube 12 and the vacuum envelope 1 by low-melting-point glass. While the total length of the laser tube may take different values depending upon the magnitude of the rated laser output, in the case of the illustrated embodiment having a rated output of 5 mW it is about 37 cm and the laser capillary tube length is about 30 cm. A mixture of He gas and Ne gas is contained in the vacuum envelope 11.

In operation, a voltage is applied between the anode 15 and the cathode 16. A laser medium is created within the laser capillary tube 12, and owing to the effects of the mirrors 13 and 14, laser oscillation occurs. The electric discharge is blown out through a hole 19 provided in the side wall of the free end portion of the laser capillary tube 12, and is spread over the entire surface of the cathode 16 by the action of the discharge diverting tube 17.

Figure 3:
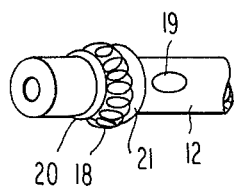
FIG. 3 is a perspective view showing the nature of mounting a coil spring on a free end portion of a laser capillary tube according to the present invention.

The structure of the end portion of the laser capillary tube 12 is shown in enlarged scale in FIG. 3, in which the coil spring 18 is placed between the ridges 20 and 21. The coil spring 18 is interposed between the laser capillary tube 12 and the discharge, diverting tube 17 in a somewhat compressed form and the free end of the laser capillary tube 12 is supported at this point. In the case where the laser capillary tube 12 elongates due to thermal expansion caused by discharge, the laser capillary tube 12 merely slides along the coil spring 18, and therefore the laser tube is not damaged.

As shown in FIGS 2 and 3, the coil spring 18 is placed between ridges 20 and 21 for preventing displacement of the coil spring 18, which ridges are formed in a swelled shape on the laser capillary tube 12. In addition, since the electric discharge is blown out through the hole 19, it does not contact the metallic coil spring 18, and therefore, the material of the coil cannot be sputtered by being bombarded by the electric discharge.

As a result of the provision of such coil spring at the free end of the laser capillary tube, the variation of output power occurring when the attitude of the laser tube is changed, can be suppressed to about 10%. Thus, compared to the output variation of 60% in the case where the capillary tube end is free, the effect of the coil spring 18 is excellent. Furthermore, it has been observed that the laser tube structure of this invention is also excellent in shock-resistance. More particularly, even when a shock of 100G (G is the gravitational constant) was applied, no defect occurred in the laser tube and also the power output was not varied. A shock of 100G is of such magnitude that, if the coil spring were not provided, the capillary tube would be broken by the shock; from this experimental result the advantageous effect of the coil spring can be understood.

Figure 4:
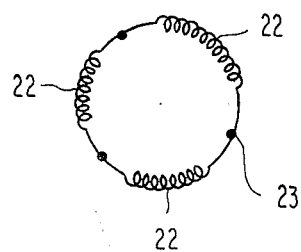
FIG. 4 is a plan view showing another example of the coil spring.

FIG. 4 shows another example of a coil spring, in which the coil spring is constructed by connection of the three coil components 22. The coil components 22 are connected by welding at junctions 23. In this case, the force applied between the laser capillary tube and the discharge diverting tube by the coil spring may be kept more uniform, as compared with the case of the coil spring formed by one coil component as shown in FIG. 3, and therefore, eccentricity of the laser capillary tube relative to the discharge diverting tube does not occur.

While one preferred embodiment of the present invention has been described above, the invention is not limited to that embodiment. Particularly with reference to FIGS. 2 and 3, the method for fixing the coil spring is not limited to the illustrated method, but other methods such that grooves are formed on the surfaces of the laser capillary tube and/or the discharge diverting tube, could be adopted.

What is claimed is:

1. A gas laser tube comprising:
   an envelope containing an active gaseous medium;
   a laser capillary tube having one end connected to an end wall of said envelope;
   a protrusion tube coaxially extending from an opposite end wall of said envelope opposite the end wall where the capillary tube is fixed, said protrusion tube overlapping a free end of said laser capillary tube; and
   a coil spring member interposed between said free end of said laser capillary tube and said protrusion tube so as to make contact with both of said tubes so as to support said free end of said laser capillary tube.

2. A gas laser tube as claimed in claim 1, wherein said protrusion tube is a discharge diverting tube for spreading a discharge over a surface of a cylindrical cathode disposed within said envelope and being fixed at its one end to said opposite end wall of said envelope and extending at its other end beyond said free end of said laser capillary tube.

3. A gas laser tube as claimed in claim 2, wherein said cathode is disposed coaxially with said protrusion tube.

4. A gas laser tube as claimed in claim 1, wherein said coil spring member comprises a plurality of interconnected coil spring elements.

5. A gas laser tube as claimed in claim 1, wherein said coil spring member is made of stainless steel.

6. A gas laser tube as claimed in claim 1, further comprising means at the free end of said laser capillary tube for preventing said coil spring member from slipping off an outer surface of said free end of said laser capillary tube.

7. A gas laser tube as claimed in claim 1, wherein said preventing means comprises a depressed portion of the outer periphery of said free end portion of said laser capillary tube.

8. A gas laser tube as claimed in claim 1, further comprising a hole in the side wall of said free end portion of said laser capillary tube for allowing the discharge to blow out.

9. A gas laser tube as claimed in claim 1, wherein said laser medium is a gas mixture of He and Ne.

* * * * *